(12) United States Patent
He et al.

(10) Patent No.: US 12,368,567 B2
(45) Date of Patent: Jul. 22, 2025

(54) HALF DUPLEX FREQUENCY DIVISION DUPLEX COLLISION HANDLING

(71) Applicant: Apple Inc., Cupertino, CA (US)

(72) Inventors: Hong He, San Jose, CA (US); Chunxuan Ye, San Diego, CA (US); Dawei Zhang, Saratoga, CA (US); Haitong Sun, Cupertino, CA (US); Huaning Niu, San Jose, CA (US); Seyed Ali Akbar Fakoorian, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/759,870

(22) PCT Filed: Aug. 5, 2021

(86) PCT No.: PCT/CN2021/111054
§ 371 (c)(1),
(2) Date: Aug. 1, 2022

(87) PCT Pub. No.: WO2023/010488
PCT Pub. Date: Feb. 9, 2023

(65) Prior Publication Data
US 2024/0297776 A1    Sep. 5, 2024

(51) Int. Cl.
*H04L 12/26*   (2006.01)
*H04L 5/16*   (2006.01)
*H04W 74/0838*   (2024.01)

(52) U.S. Cl.
CPC ........... *H04L 5/16* (2013.01); *H04W 74/0838* (2024.01)

(58) Field of Classification Search
USPC ................................ 370/329, 330, 333, 338
See application file for complete search history.

(56) References Cited

U.S. PATENT DOCUMENTS

| | | | |
|---|---|---|---|
| 2020/0281018 A1* | 9/2020 | Li | H04W 80/08 |
| 2021/0135832 A1* | 5/2021 | Ly | H04L 5/16 |

FOREIGN PATENT DOCUMENTS

| | | |
|---|---|---|
| CN | 106465309 | 2/2017 |
| CN | 113170475 | 7/2021 |

(Continued)

OTHER PUBLICATIONS

Ericsson, "Reduced maximum UE bandwidth for RedCap", 3GPP TSG-RAN WG1 Meeting #105-e, R1-2104179, May 12, 2021, 29 sheets.

*Primary Examiner* — Zewdu A Beyen
(74) *Attorney, Agent, or Firm* — Fay Kaplun & Marcin, LLP

(57) ABSTRACT

A user equipment (UE) is configured to determine that half-duplex frequency division duplex (HD-FDD) is enabled by a network with which the UE is communicating, identify a collision between a cell-specific downlink reception and a cell-specific uplink transmission and implement a HD-FDD collision handling technique. A UE may also be configured to determine that half-duplex frequency division duplex (HD-FDD) is enabled by a network with which the UE is communicating, perform a first cell-specific uplink transmission at a first time and perform a first cell-specific downlink reception at a second time, wherein a guard period represents a time duration between the first time and the second time during which the UE is not to perform a second different cell-specific uplink transmission or a second different cell-specific downlink reception.

20 Claims, 10 Drawing Sheets

(56) References Cited

FOREIGN PATENT DOCUMENTS

| WO | 2020/231316 | 11/2020 |
|----|-------------|---------|
| WO | 2021/029751 | 2/2021  |
| WO | 2021/161622 | 8/2021  |

\* cited by examiner

HALF DUPLEX FREQUENCY DIVISION DUPLEX COLLISION HANDLING

TECHNICAL FIELD

This application relates generally to wireless communication systems, and in particular relates to half duplex frequency division duplex collision handling.

BACKGROUND

A network may implement a half-duplex frequency division duplex (HD-FDD) scheme. When HD-FDD is enabled, a user equipment (UE) switches between transmission and reception operations. This is in contrast to a full duplex FDD (FD-FDD) scheme where the UE may simultaneously transmit and receive signals. It may be beneficial for fifth generation (5G) new radio (NR) to support HD-FDD operations.

SUMMARY

Some exemplary embodiments are related to a processor of a user equipment (UE) configured to perform operations. The operations include determining that half-duplex frequency division duplex (HD-FDD) is enabled by a network with which the UE is communicating, identifying a collision between a cell-specific downlink reception and a cell-specific uplink transmission and implementing a HD-FDD collision handling technique.

Other exemplary embodiments are related to a processor of a user equipment (UE) configured to perform operations. The operations include determining that half-duplex frequency division duplex (HD-FDD) is enabled by a network with which the UE is communicating, performing a first cell-specific uplink transmission at a first time and performing a first cell-specific downlink reception at a second time, wherein a guard period represents a time duration between the first time and the second time during which the UE is not to perform a second different cell-specific uplink transmission or a second different cell-specific downlink reception.

Still further exemplary embodiments are related to a processor of a base station configured to perform operations. The operations include configuring an initial downlink bandwidth part (BWP) for a reduced capability (redcap) user equipment (UE), configuring a different initial downlink BWP for a non-redcap UE and transmitting a signal to the redcap UE over the initial downlink BWP configured for the redcap UE.

DETAILED DESCRIPTION

Figure 1:
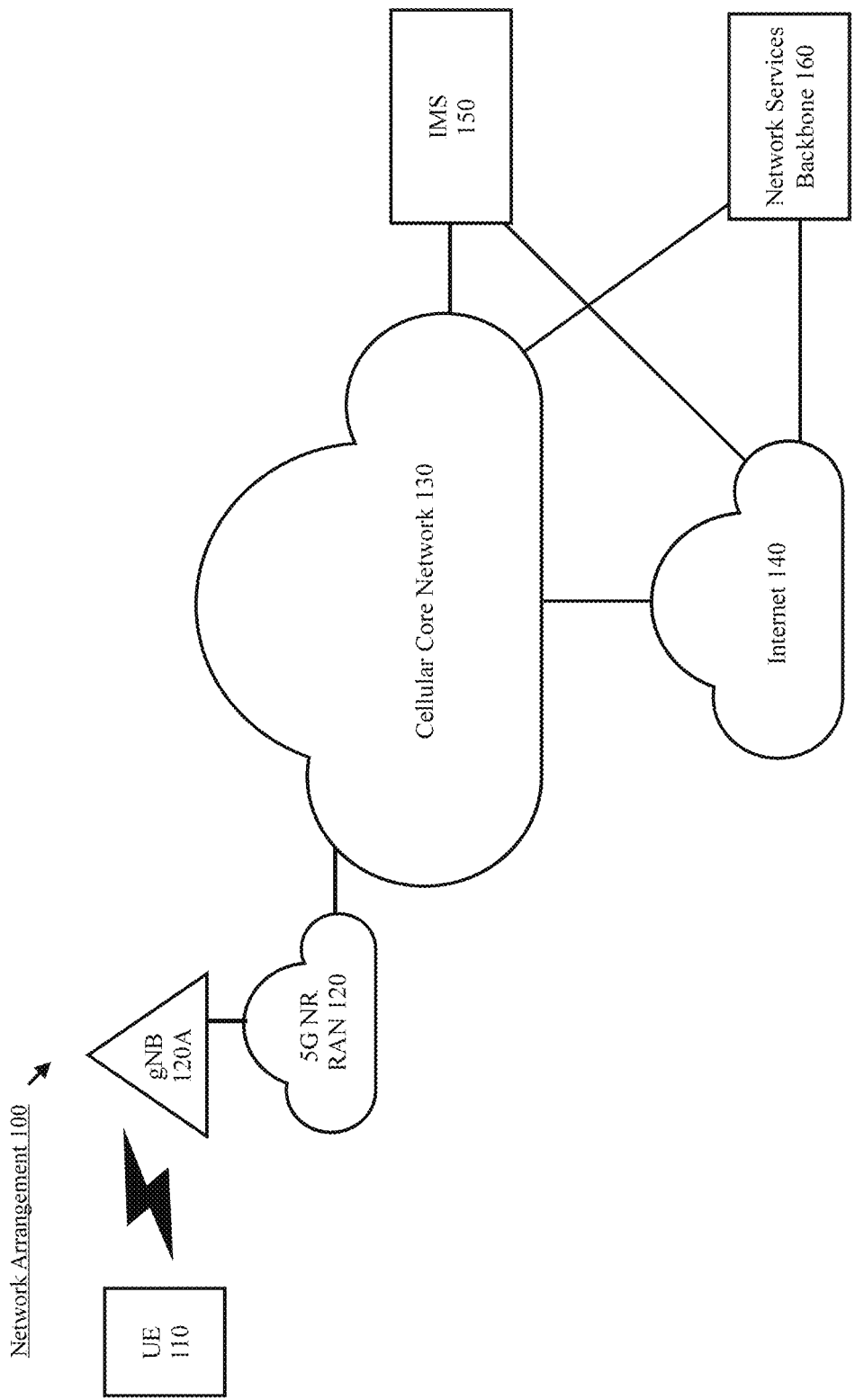
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce techniques to support half-duplex frequency division duplex (HD-FDD) operation in fifth generation (5G) new radio (NR).

For full duplex FDD (FD-FDD) operations, a user equipment (UE) may be configured with multiple carrier frequencies including one or more frequencies to be used for uplink transmissions and one or more frequencies to be used for downlink transmissions. Thus, when FD FDD is enabled, the UE may be capable of simultaneous transmission and reception. In contrast, HD-FDD does not support simultaneous transmission and reception at the UE. Instead, when HD-FDD is enabled, the UE switches between transmission and reception operations.

There exists a need for mechanisms configured to support "reduced capability (redcap) NR devices." These types of devices may be characterized as a UE with lower end capabilities (relative to release 16 enhanced mobile broadband (eMBB) devices and ultra-reliable low latency communication (URLLC) devices) configured to serve use cases including, but not limited to, industrial wireless sensors, video surveillance, wearable devices, etc. It has been identified that it may be beneficial to implement a HD-FDD scheme to support reduced capability NR devices.

While the exemplary embodiments may provide various benefits to reduced capability NR devices, the exemplary embodiments are not limited to these types of devices and may provide benefits to any device configured for HD-FDD operation. The exemplary embodiments apply to any electronic device configured with HD-FDD capabilities. Thus, the UE as described herein may represent any type of electronic device configured with HD-FDD capabilities.

In one aspect, the exemplary embodiments introduce collision handling techniques for cell-specific downlink reception and cell-specific uplink transmission at the UE. As indicated above, in HD-FDD operations, the UE may not perform simultaneous transmission and reception. These exemplary collision handling techniques allow the UE to respond to and/or avoid a collision between cell-specific downlink reception (e.g., synchronization signal blocks (SSBs), downlink control information (DCI), type 0 css, type 0A CSS, type 1 CSS, type 2 CSS, etc.) and cell-specific uplink signals transmitted during random access channel (RACH) occasions (ROs) for HD-FDD operations.

In another aspect, the exemplary embodiments introduce an initial downlink bandwidth part (BWP) that is dedicated for reduced capability NR device. Specific examples of both these exemplary aspects will be described in more detail below. Those skilled in the art will understand that the exemplary embodiments may be used in conjunction with currently implemented HD-FDD protocols, future implementations of HD-FDD protocols or independently from other HD-FDD protocols.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, Internet of Things (IoT) devices, wearables (e.g., medical devices, augmented reality goggles, virtual reality googles, smart watches, etc.), industrial wireless sensors, video surveillance devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., the next generation Node B (gNB) 120A.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
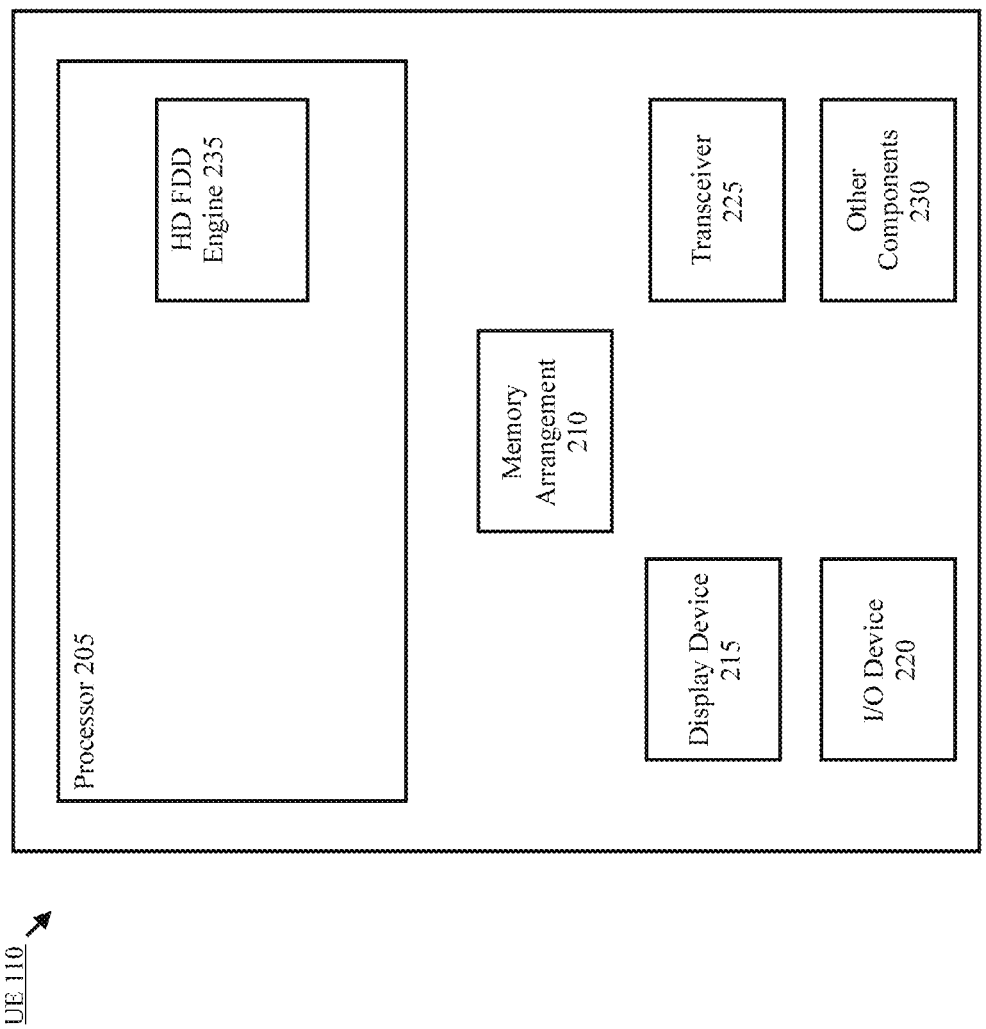
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include an HD-FDD engine 235. The HD-FDD engine 235 may perform various operations related to HD-FDD communication such as, but not limited to, enabling/disabling HD-FDD at the UE 110, configuring a guard period, communicating with the network using HD-FDD, etc.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
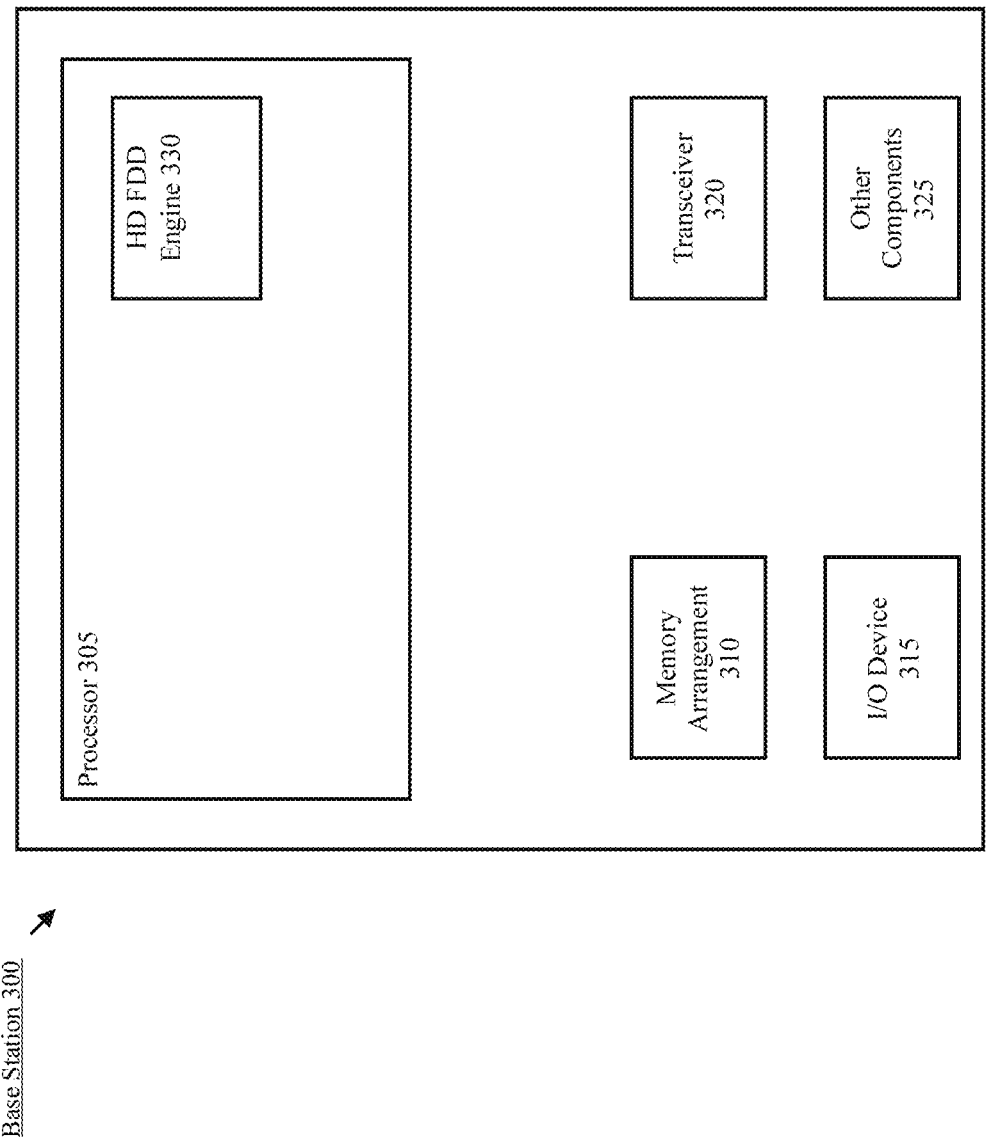
FIG. 3 shows an exemplary base station according to various exemplary embodiments.

FIG. 3 shows an exemplary base station 300 according to various exemplary embodiments. The base station 300 may represent the gNB 120A or any other access node through which the UE 110 may establish a connection and manage network operations.

The base station 300 may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the base station 300 to other electronic devices, etc.

The processor 305 may be configured to execute a plurality of engines of the base station 300. For example, the engines may include an HD-FDD engine 330. The HD-FDD engine 330 may perform various operations related to HD-FDD communication such as, but not limited to, enabling/disabling HD-FDD at the UE 110, configuring a guard period, communicating with the UE 110 using HD-FDD, etc.

The above noted engine 330 each being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

The exemplary embodiments relate to HD-FDD operation in 5G NR. As mentioned above, when HD-FDD is enabled, the UE 110 does not perform simultaneous reception and transmission. In one aspect, the exemplary embodiments introduce collision handling techniques for cell-specific downlink traffic and cell-specific uplink traffic at the UE 110. These exemplary techniques may enable the UE 110 to handle the overlapping cell-specific downlink traffic and cell-specific uplink traffic in accordance with the HD-FDD restriction on simultaneous transmission and reception.

In one approach, when HD-FDD is enabled, the UE 110 does not expect to simultaneously receive cell-specific downlink traffic and transmit cell-specific uplink traffic. This may include a guard period or switching gap during which neither downlink reception nor uplink transmission are expected to occur at the UE 110.

Throughout this description, cell-specific downlink receptions may include, but is not limited to, SSB, synchronization signal (SS)/physical broadcast channel (PBCH) blocks configured by "ssb-PositioninBurst" parameter in system information block 1 (SIB1) or by the "ServingCellConfigCommon" radio resource control (RRC) parameter, DCI, type 0 common search space (CSS), type 0A CSS, type 1 CSS and type 2 CSS. Cell-specific uplink transmissions may include, but is not limited to, RACH signaling or physical random access channel (PRACH) signaling. These uplink signals may be transmitted during a slot comprising one or more ROs. The above examples are merely provided for illustrative purposes, those skilled in the art will understand the type of downlink reception and uplink transmission that may be characterized as cell-specific.

Figure 4:
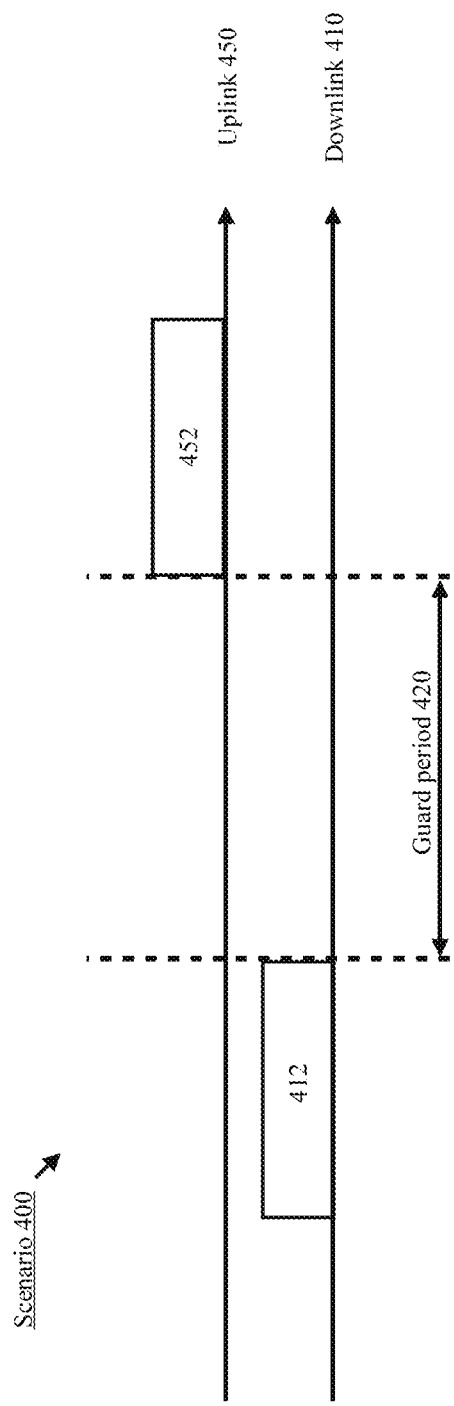
FIG. 4 shows a scenario that illustrates a guard period for cell-specific downlink reception and cell-specific uplink transmission according to various exemplary embodiments.

FIG. 4 shows a scenario 400 that illustrates a guard period for cell-specific downlink reception and cell-specific uplink transmission according to various exemplary embodiments. The scenario 400 depicts a downlink timeline 410 that represents cell-specific downlink activity relative to the UE 110 and an uplink timeline 450 that represents cell-specific uplink activity relative to the UE 110.

In the scenario 400, at a first time, the UE 110 performs operations related to receiving downlink information and/or data during 412. At a second time, the UE 110 performs operations related to transmitting uplink information and/or data during 452. As mentioned above, when HD-FDD is enabled, the UE 110 may not be configured to handle downlink and uplink communications simultaneously. Thus, in the scenario 400, downlink and uplink activity do not overlap in time.

A guard period 420 is also configured. During the guard period 420, the UE 110 does not expect to perform either downlink receptions or uplink transmissions. In this example, the guard period 420 is represented by (N) symbols, where $N=\max\{N_{gap}, N_{TX-RX}\}$. The parameters $N_{gap}$, $N_{TX-RX}$ may be predetermined and hard encoded in the third generation partnership (3GPP) standards or provided to the UE 110 in any other appropriate manner.

To provide an example, a PRACH configuration index (e.g., #118, #120, #122, #129 in 3GPP Technical Specification (TS) 38.211, etc.) may be used for a RO configuration of a frequency range 1 (FR1) FDD serving cell to avoid collision with SSB transmission since these configurations may allocate ROs in subframe 4 or 9 and therefore avoid overlapping between ROs and SSBs in FR1.

In an alternative approach, the UE 110 may expect cell-specific downlink reception and cell-specific uplink transmission to overlap in time (with or without a guard period). However, simultaneous transmission and reception is still not permitted in HD-FDD for a given UE. The exemplary techniques provided below relate to the UE 110 behavior when cell-specific downlink and cell-specific uplink operations overlap in time. These exemplary techniques enable the UE 110 to handle cell-specific downlink reception and cell-specific uplink transmission in accordance with the HD-FDD restrictions on simultaneous transmission and reception.

Figure 5:
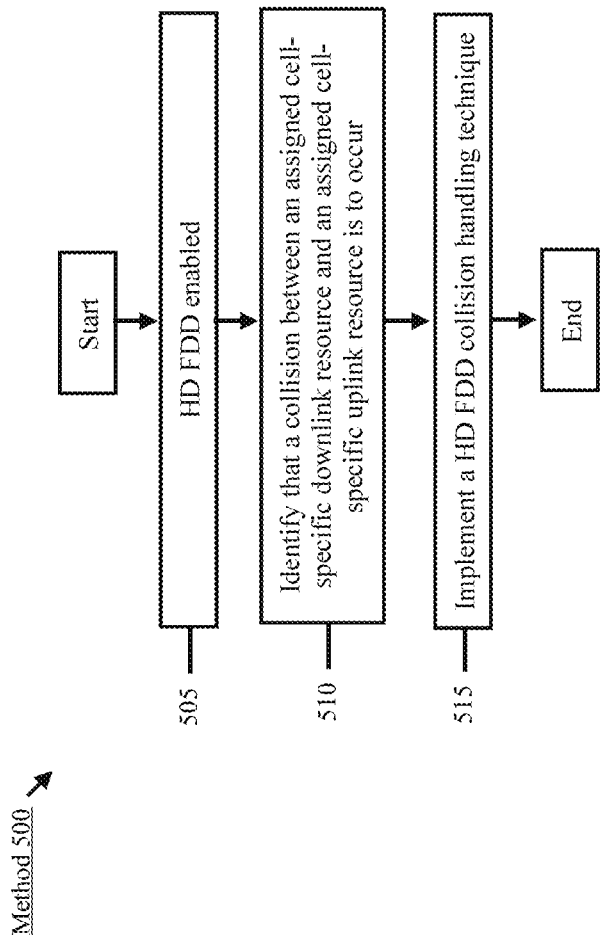
FIG. 5 shows a method for half duplex frequency division duplex (HD-FDD) operation according to various exemplary embodiments.

FIG. 5 shows a method 500 for HD-FDD operation according to various exemplary embodiments. The method 500 will be described from the perspective of the UE 110 and is intended to provide a general overview of UE 110 behavior with regard to a HD-FDD scheme in which the UE 110 may expect cell-specific downlink traffic and cell-specific uplink traffic to overlap in time (with or without a guard period). Specific examples of collision handling techniques for HD-FDD operation will be provided after the description of the method 500.

Initially, assume a scenario in which the UE 110 is camped on a serving cell operated by the gNB 120A. Both the UE 110 and the gNB 120A support HD-FDD. In 505, HD-FDD is enabled. For example, after the UE 110 powers on, the UE 110 may search for a cell that supports HD-FDD (e.g., qNB 120A). In another example, the UE 110 may support both HD-FDD and FD-FDD. The UE 110 and/or the network may identify a condition and then trigger the UE 110 to activate an HD-FDD mode of operation.

In 510, the UE 110 identifies that a collision between an assigned cell-specific downlink resource and an assigned cell-specific uplink resource is to occur. For example, the UE 110 may identify that the downlink resource and the uplink resource overlap in time or that one of these resources overlaps with an HD-FDD guard period.

In 515, the UE 110 may implement a HD-FDD collision handling technique. The HD-FDD collision handling technique enables the UE 110 to satisfy the HD-FDD restriction on simultaneous downlink reception and uplink transmission. To provide one general example, the UE 110 may prioritize the downlink reception over the uplink transmission or vice versa. The prioritized channel/signal may be received or transmitted at its originally scheduled time/frequency resource and the other operation may be deferred to a subsequent time. Specific examples of the exemplary HD-FDD collision handling techniques will be provided in detail below.

Some of the exemplary techniques are described with regard to RO validation which refers to a mechanism in which the UE 110 determines whether a RO is "valid" or "invalid." Those skilled in the art will understand that in 5G NR, each SSB in a set of SSBs may be associated with a different downlink beam. The UE 110 may select an adequate downlink beam and then indicate its selection to the network by transmitting a PRACH signal over the corresponding RO associated with the selected SSB. The network may implement a defined mapping between SSBs and ROs. Therefore, by detecting which RO the UE 110 utilizes for the PRACH transmission over the selected RO, the network may determine which downlink beam the UE 110 selected based on the mapping between the SSBs and the ROs. Throughout this description, when a RO is considered "valid" it is to be used for mapping between SSBs and ROs in a HD-FDD scheme. When a RO is considered "invalid" it is not to be used for the mapping between SSBs and ROs in a HD-FDD scheme.

In one approach, all ROs configured by the network via the higher-layer parameter "prach-ConfigurationIndex" in SIB1 are to be considered valid and used for the mapping between SSBs and ROs. This may be implemented to avoid a different mapping between SSBs and ROs for UEs operating in HD-FDD mode (e.g., UE 110) and UEs operating in FD-FDD mode. However, reference to higher layer signaling or any particular higher layer parameter is merely provided for illustrative purposes. The exemplary embodiments may apply to the network providing this type of indication to the UE 110 in any appropriate manner.

Examples of several different HD-FDD collision handling techniques that may be performed in conjunction with the above-referenced RO validation approach are described below. In some embodiments, when all ROs configured by the network are to be considered valid, the SSB reception may be prioritized over the overlapped RO. If a RO is overlapped with a cell-specific SSB, the UE 110 defers the PRACH transmission that may be scheduled for this RO to the next RO that is associated with the selected SSB. An example of this HD-FDD collision handling technique is provided below in FIG. 6.

Figure 6:
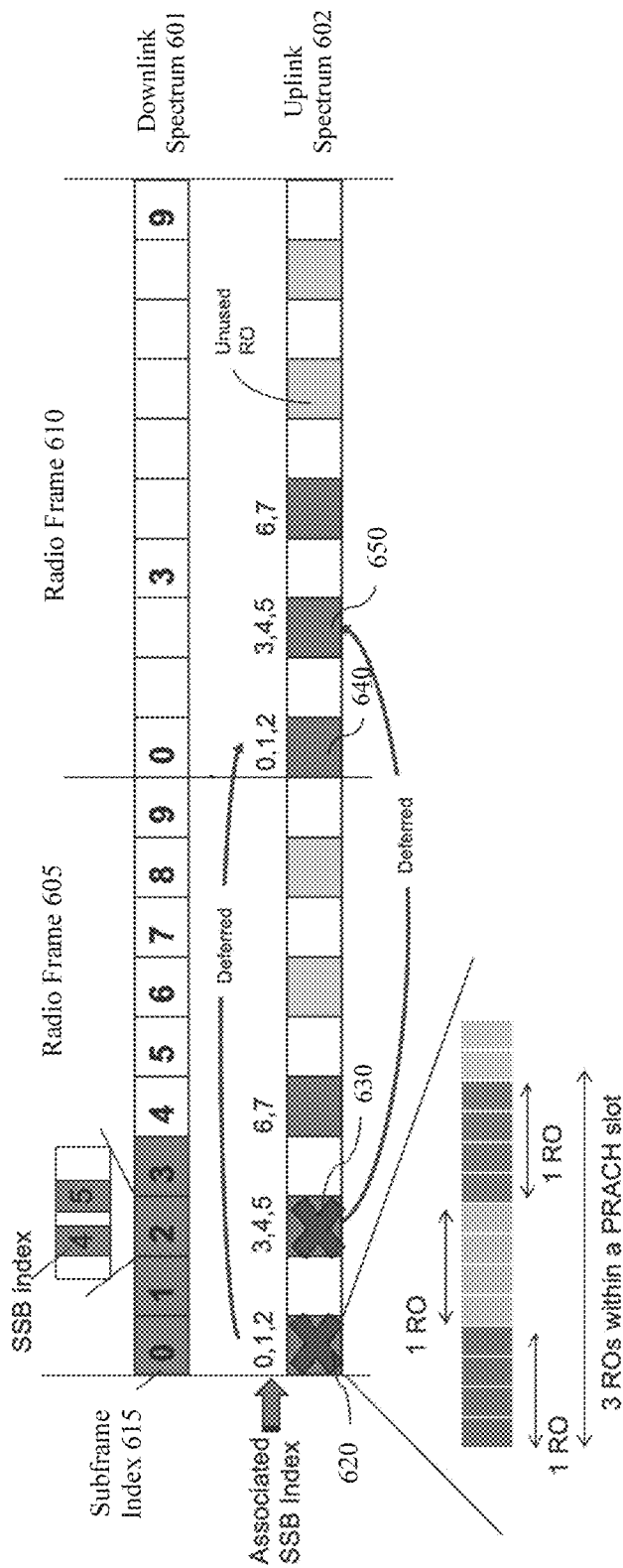
FIG. 6 shows one example of synchronization signal block (SSB) prioritization in case of a collision of one or more SSBs and one or more random access channel (RACH) occasions (ROs) according to various exemplary embodiments.

FIG. 6 shows one example of SSB prioritization in case of a collision of one or more SSBs and one or more ROs. In this example, the spectrum is located in FR1 and the 3GPP TS 38.211 prach-ConfigurationIndex parameter is set to "134." This index value is mapped to various parameters such as, but not limited to, which PRACH format is to be used, when the UE 110 is to send signals over the PRACH in the time domain and the number of ROs available. However, as mentioned above, the exemplary embodiments are not limited to providing this type of information to the UE 110 in this manner and may utilize any appropriate implicit or explicit indication.

FIG. 6 shows a downlink spectrum 601 and an uplink spectrum 602 of a FDD serving cell across two consecutive radio frames 605, 610. Radio frame 605 represents an even numbered radio frame and radio frame 610 represents an odd numbered radio frame. In this example, the subcarrier spacing (SCS) is 15 kilo hertz (kHz) and the SSB pattern is 15 kHz with 8 SSBs in a single radio frame. The radio frame 605 comprises subframes indexed 0-9 and the radio frame 610 also comprises subframes indexed 0-9, however, only subframes 0, 3 and 9 of radio frame 610 are marked in FIG. 6.

In radio frame 605, subframes 0-3 include 8 SSBs that are indexed 0-7. Each of the subframes indexed 0-3 include 2 SSBs. An example of this is shown in FIG. 6 via the exploded view of subframe 2 of the radio frame 605.

FIG. 6 shows there are 10 PRACH slots on the uplink spectrum 602, 5 PRACH slots in radio frame 605 in subframes 0, 2, 4, 6, 8 and 5 PRACH slots in radio frame 610 in subframes 0, 3, 4, 6, 8. Each PRACH slot comprises 3 ROs. As mentioned above, there may be a mapping of SSBs and ROs. Thus, the values of the associated SSB index are shown in each PRACH slot on the uplink spectrum 602 to demonstrate the mapping between the SSB index and their associated ROs. An example of the PRACH and RO relationship is shown in the exploded view of PRACH slot 620.

In this example, PRACH slots 620 and 630 overlap in time with the SSBs 0-2 in subframe 0 and SSBs 3-5 in subframe 2 of radio frame 605. Since the UE 110 prioritizes SSB reception and is operating in HD-FDD mode, the UE 110 performs SSB reception during subframes 0-3 and would not perform any transmissions during these subframes. Thus, if the UE 110 selected any of the SSBs indexed 0-2 or 3-5, the UE 110 would defer the corresponding uplink transmission to the next RO associated with the selected SSB. Although this example is described from the perspective of a HD-FDD device, all of the ROs configured by SIB1 are used for mapping between SSBs and ROs for both HD-FDD and FD FDD UEs.

To provide an example, in FIG. 6, SSBs 0-2 are associated with the ROs in PRACH slot 620 and SSBs 3-5 are associated with the ROs in PRACH slot 630. If the UE 110 selected any of the SSBs indexed 0-2, the UE 110 defers the corresponding uplink transmission to the next RO associated with the SSB. In this example, the PRACH slot 640 is also associated with the SSBs indexed 0-2 and thus, the UE 110 would defer the uplink transmission to PRACH slot 640 if the UE 110 selected any of the SSBs indexed 0-2. If the UE 110 selected any of the SSBs indexed 3-5, the UE 110 defers the corresponding uplink transmission to the next RO associated with the SSB. In this example, the PRACH slot 650 is also associated with the SSBs indexed 3-5 and thus, the UE 110 would defer the uplink transmission to PRACH slot 640 if the UE 110 selected any of the SSBs indexed 3-5.

In other embodiments, when all ROs configured by the network are to be considered valid, the ROs may be prioritized over the downlink traffic (e.g., cell-specific SSBs, etc). In accordance with this HD-FDD collision handling technique, when there is a collision, the UE 110 performs the transmission during the RO and does not perform the overlapping SSB reception. In this example, the SSB may be selected by the UE 110 prior to the initiation of the random access procedure. Thus, within the context of FIG. 6, the UE 110 has already selected an SSB prior to radio frame 605 and may not receive some or all of the SSBs in radio frame 605 because the UE 110 may be performing a transmission during one the overlapping PRACH slots 620, 630.

In other embodiments, when all ROs configured by the network are to be considered valid, the HD-FDD collision handling technique may comprise implementing a random access type dependent prioritization rule. For contention-based PRACH, the UE 110 may select to prioritize either SSB reception or RO transmission. However, if the PRACH transmission is initiated by a physical downlink control channel (PDCCH) that triggers a contention-free random access procedure, the RO transmission may be prioritized over the SSB reception. Alternatively, the UE 110 may select to prioritize either SSB reception or RO transmission in a contention-free scenario.

In another approach, one or more of the following conditions may cause the ROs configured by the higher layer parameter "prach-ConfigurationIndex" in SIB1 to be considered invalid. This is in contrast to the RO validation approach described above where all the ROs are considered valid. In some embodiments, a RO configured by the network may be considered invalid if the RO is overlapped with a SSB or starts less than N=max $\{N_{gap}, N_{TX-Rx}\}$ symbols after a last SSB symbol provided by the parameter ssb-PositionInBurst in SIB1 or by the "ServingCellConfigCommon" RRC parameter. In this approach, invalid ROs are not considered when determining the association between SSBs and ROs. An example of this RO validation approach and several corresponding HD-FDD collision handling techniques are provided below in FIG. 7.

Figure 7:
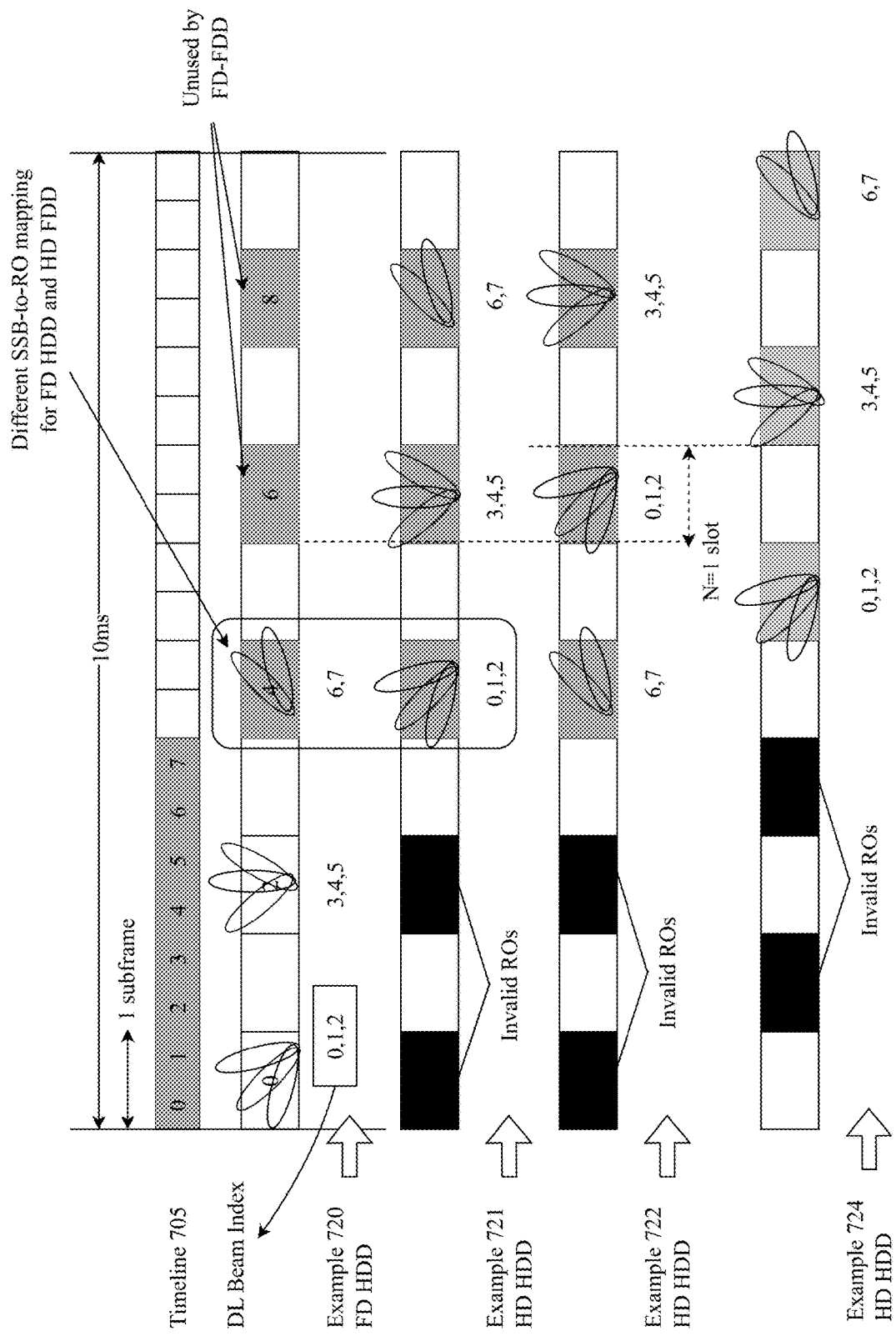
FIG. 7 shows some examples of HD-FDD collision handling techniques that may be used when one or more ROs are considered invalid according to various exemplary embodiments.

FIG. 7 shows some examples of HD-FDD collision handling techniques that may be used when one or more ROs are considered invalid. FIG. 7 includes a timeline 705 with a duration of 10 ms and subframes indexed 0-7. In this example, it may be considered that the SCS is 15 KHZ, each of the subframes indexed 0-7 include a single SSB for a total of 8 SSB with an SSB periodicity of 10 ms.

In FIG. 7, there are 4 different examples 720-724 of uplink configuration. Example 720 relates to a FD-FDD UE and includes 3 ROs in PRACH slot 0, 3 ROs in the PRACH slot 2 and 2 ROs in PRACH slot 4. PRACH slots 6 and 8 are not used by the FD-FDD UE. In all of the examples 720-724, under each PRACH slot, the corresponding downlink beam index is shown. As mentioned above, each downlink beam is associated with a particular SSB and corresponding RO.

It has been identified that it may be beneficial to avoid a different SSB-to-RO mapping for HD-FDD UEs and FD-FDD UEs in a same serving cell. Example 721 relates to a HD-FDD UE and includes 2 sets of invalid ROs in PRACH slots 0 and 2 because they overlap in time with SSB reception. However, if the ROs are deferred to the next valid RO, it may cause the FD-FDD UE in example 720 and the HD-FDD UE in example 721 to have different SSB-to-RO mappings. When there is a different mapping, there may be misaligned receiver (RX) beams at the gNB which may cause the gNB to be unable to receive the preamble of one of the HD-FDD UE or the FD FDD UE uplink transmissions. In addition, when there is a different mapping, the network may wrongly assume that the HD-FDD UE is an FD-FDD UE or vice versa which may cause a misalignment between the relevant UE and gNB with regard to the location of type-1 common search space (CSS) for the subsequent RACH response (RAR).

Example 722 also relates to a HD-FDD UE and includes 2 sets of invalid ROs in PRACH slots 0 and 2 because they overlap in time with SSB reception. This exemplary HD-FDD collision technique includes deferring an RO to a next valid RO that is not associated any SSBs and/or downlink beams. Thus, the ROs not used by the FD-FDD UE in example 720 may be utilized for the HD-FDD UE in example 722. In this example, the first set of invalid ROs are deferred to PRACH slot 6 and the second set of invalid ROs are deferred to PRAHC slot 8. The ROs scheduled for PRACH slot 4 are not deferred to maintain an alignment between the SSB-to-RO mapping for FD-FDD UEs and HD-FDD UEs.

Example 724 also relates to a HD-FDD UE. However, in this example, time division multiplexing (TDM) may be utilized to separate ROs associated with FD-FDD UEs and HD-FDD UEs by PRACH resource configuration by the gNB. A comparison between example 724 and example 720 demonstrate this TDM configuration. Here, the PRACH slot index may be deferred (N) slots relative to the RO slots configured for FD-FDD UEs. The value of (N) may be hard-encoded in the 3GPP standard, provided via higher layer signaling or provided to the UE 110 in any other appropriate manner. In example 724, the ROs of the first and second configured PRACH slots are considered invalid because they overlap with SSBs.

The above examples described collision scenarios involving SSBs and ROs. The following HD-FDD collision handling techniques relate to a collision between valid ROs and cell-specific downlink reception other than SSBs.

In one HD-FDD collision handling technique, a valid RO may be prioritized over cell-specific downlink traffic configured by higher-layers. For example, the valid RO may be prioritized over semi-statically configured downlink receptions such as, but not limited to, type 0 CSS, type 0A CSS, type 1 CSS, type 2 CSS, channel state information (CSI)-reference signals (RS), tracking reference signals (TRS) and positioning reference signals (PRS).

In another HD-FDD collision handling technique, type 0/0A/1/2 CSS may be prioritized if it overlaps with a valid RO. Otherwise, the RO is prioritized. This technique may allow the UE 110 to avoid mis-detection of common control signaling including, but not limited to, SIB, RAR, paging, etc. Alternatively, type 1 PDCCH CSS that is used for a DCI format with cyclic redundancy check (CRC) scrambled by a random access (RA)-radio network temporary identifier (RNTI), a message B (msgB)-RNTI or a temporary cell (TC)-RNTI on the primary cell for RAR scheduling may be prioritized over an overlapped RO if the UE 110 transmitted PRACH and the overlapped type 1 CSSS is in the corresponding RAR window. Otherwise, the RO is prioritized.

In another RO validation approach, valid ROs and cell-specific downlink reception may be configured by higher layers or dynamically indicated by DCI. In one HD-FDD collision handling technique, priority may be semi-statically configured by higher layers (e.g., SIB information or UE dedicated RRC signaling) for each channel including, but not limited to, the configuration of configuration grant (CG)-physical uplink shared channel (PUSCH), downlink semi-persistent scheduling (SPS), physical uplink control channel (PUCCH) and type 0/0A/1/2 CSS. In this example, a priority indication information element (IE) may be introduced for the purposes of indicating whether cell-specific downlink reception or cell-specific uplink transmission is to be prioritized. The prioritized downlink or uplink operation may occur at the time of the identified collision and the other operation will be deferred.

Figure 8:
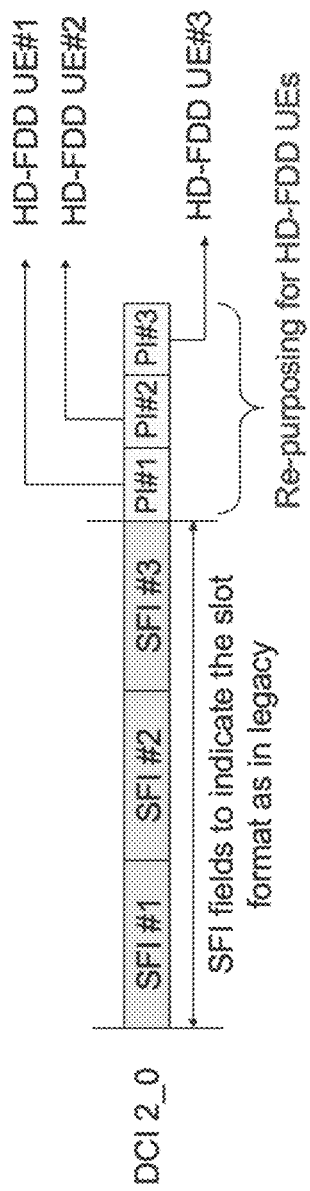
FIG. 8 shows an example of downlink control information (DCI) configured with HD-FDD priority indicators according to various exemplary embodiments.

In another HD-FDD collision handling technique, priority may be indicated by DCI. For example, some fields in DCI format 2_0 may be repurposed to indicate the priority an example of which is shown in FIG. 8. In this example, SFI fields 1-3 indicate the slot format as in the legacy approach.

The remaining portion of the DCI may be used to provide a priority indicator (PI) to HD-FDD UEs. Each PI field corresponds to a different HD-FDD UE. However, the exemplary embodiments are not limited to DCI format 2_0 or 3 PIs per DCI. Any appropriate type of DCI may be configured to include any appropriate number of PIs or a new type of DCI may be introduced for this purpose.

To provide an example from the perspective of the UE 110, when a PI is set to a first value (e.g., 0), this may indicate to the UE 110 that ROs are to be prioritized over cell-specific downlink reception. When the PI is set to a second value (e.g., 1), this may indicate to the UE 110 that cell-specific downlink traffic is to be prioritized over ROs. The type of downlink reception that is to be prioritized may be configured by higher layers. Thus, in some embodiments, a combination of higher layer signaling and DCI may be used by the UE 110 to determine any prioritizations.

When using the above-reference techniques, there may be a scenario in which a valid RO collides with cell-specific reception configured by higher layers. To address this type of scenario, a contention free random access (CFRA) rule may be implemented. An example of utilizing this rule is shown below in FIG. 9.

Figure 9:
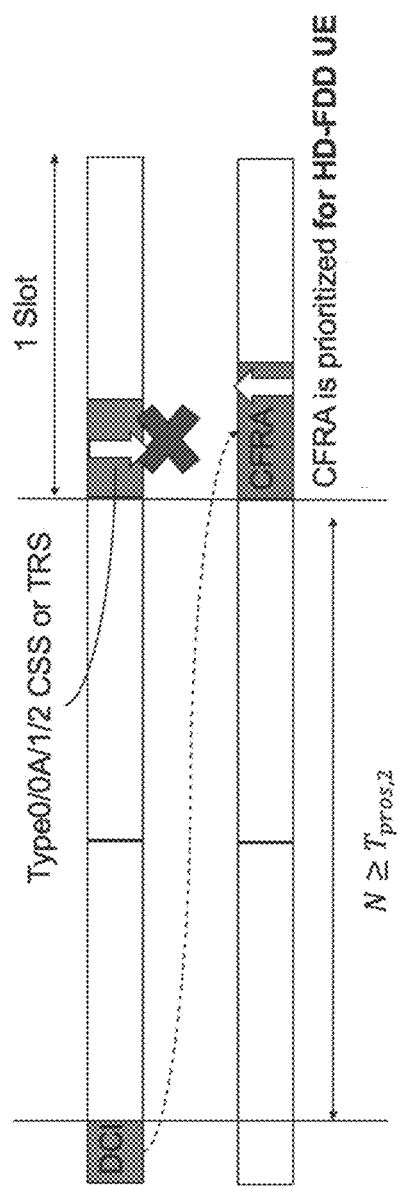
FIG. 9 shows one example of utilizing a contention free random access (CFRA) prioritization rule for HD-FDD operation according to various exemplary embodiments.

FIG. 9 shows one example of utilizing a CFRA prioritization rule for HD-FDD operation. In some embodiments, CFRA triggered by a PDCCH signal (e.g., DCI) is always prioritized if the first symbol of the CFRA is to occur within $T_{pros}$, 2 relative to a last symbol of a control resource set (CORESET) where the UE 110 detected the PDCCH signal. The value of $T_{pros}$, 2 is preparation time requirement for uplink transmission, which may be hard encoded in 3GPP specification.

In FIG. 9, the CFRA is prioritized over type 0/0A/1/2 CSS, CSI-RS, TRS and PRS because it was triggered by DCI that was received earlier than $T_{pros}$, 2 relative to the first symbol of the CFRA resource.

Figure 10:
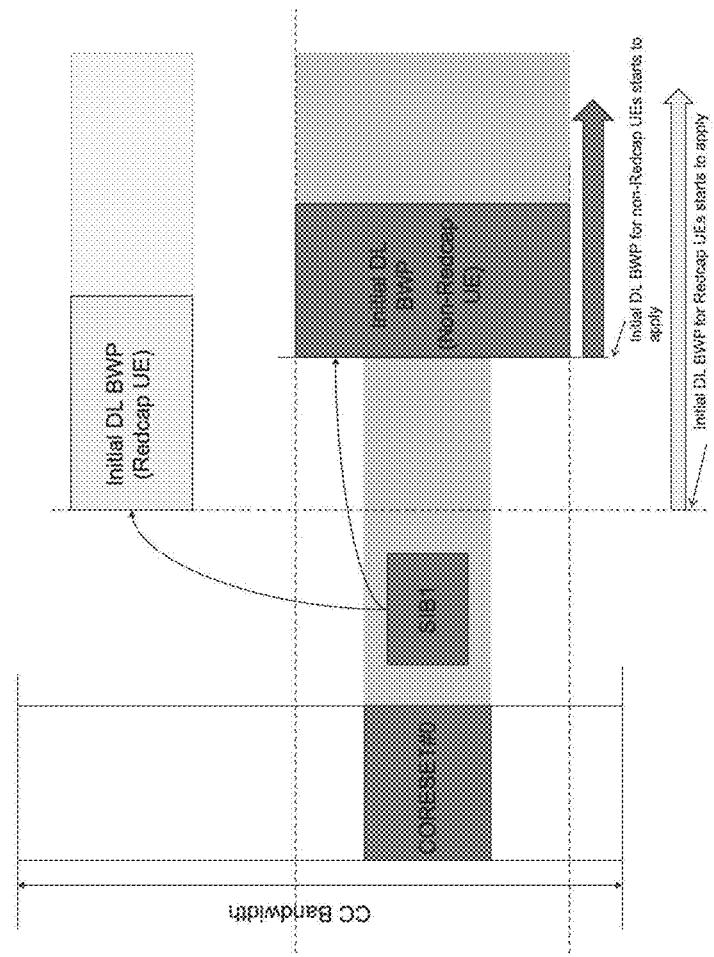
FIG. 10 shows an example of an initial downlink bandwidth part (BWP) for reduced capability NR devices that is separate from the initial downlink BWP for non-reduced capability devices according to various exemplary embodiments.

As mentioned above, in another aspect, the exemplary embodiments introduce a reduced capability NR device specific initial downlink BWP. FIG. 10 shows an example of an initial downlink BWP for reduced capability NR devices that is separate from the initial downlink BWP for non-reduced capability devices. For the non-redcap UEs, the initial downlink BWP that is configured by SIB1 may be applied after initial access (e.g., after RRC setup, RRC resume or RRC reestablishment). Thus, in FIG. 10, RRC signaling may occur between the reception of the SIB1 and the initial downlink BWP for non-redcap UEs.

In contrast, for redcap UEs, a common control signaling configuration may be applied for the initial access procedure after SIB1 is decoded. An example of the common control signaling will be described below. However, the exemplary embodiments are not limited to the common control signaling configuration described herein. The initial downlink BWP for reduced capability NR devices may be configured in any appropriate manner.

During operation, the UE 110 may receive configuration information for the initial downlink BWP for redcap UEs. This configuration information may be received prior to example illustrated in FIG. 10. To provide an example, the configuration information may be received in a PDCCH-ConfigCommon message that includes various common search space parameters. However, reference to the PDCCH-ConfigCommon message is provided for illustrative purposes. The configuration information for the initial downlink BWP for redcap UEs may be provided to the UE 110 in any appropriate manner.

The configuration information may include a search space for SIB1 parameter that identifies or indicates the search space for SIB1 that may be used by a redcap UE. The configuration information may also include a random access search space parameter that identifies or indicates the search space that may be used for random access procedures by a redcap UE. The random access search space for redcap UEs (e.g., the initial downlink BWP for recap UEs shown in FIG. 10.) allows the network to offload RACH procedure traffic for redcap UEs to other BWPs to avoid congestion and impact on non-redcap UEs. Thus, in contrast to the initial downlink BWP for non-redcap UEs, the initial downlink BWP for redcap UEs may be utilized for the RRC signaling that may occur during the RACH procedure. In FIG. 10, the initial downlink BWP for redcap UEs starts to apply earlier than the initial downlink BWP for non-redcap UEs to demonstrate the effect of this common control signaling.

The configuration information may also include a paging search space parameter for redcap UEs. In addition, a non-zero power (NZP) CSI-RS resource set may be configured for redcap UEs via a higher layer parameter "trs-info" within the redcap specific initial BWP or SSB configuration (e.g., periodicity, absolute radio frequency channel number (ARFCN)) such that redcap UEs avoid the radio frequency (RF) retuning to performing time and frequency tracking.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   determining that half-duplex frequency division duplex (HD-FDD) is enabled by a network with which the UE is communicating;

identifying a collision between a cell-specific downlink reception and a cell-specific uplink transmission; and implementing a HD-FDD collision handling technique, wherein the HD-FDD collision handling technique comprises prioritizing a valid random access channel (RACH) occasion (RO) over a cell-specific downlink reception except for a downlink reception corresponding to type 0 common search space (CSS), type OA CSS, type 1 CSS or type 2 CSS which is prioritized over the valid RO, wherein the valid RO is used for a mapping between SSBs and ROs and an invalid RO is not used for the mapping.

2. The processor of claim 1, the operations further comprising:

determining that all random access channel (RACH) occasions (ROs) configured by a system information block 1 (SIB1) are valid, wherein a valid RO is used for a mapping between synchronization signal blocks (SSBs).

3. The processor of claim 2, wherein the HD-FDD collision handling technique comprises prioritizing SSB reception over ROs.

4. The processor of claim 3, wherein the cell-specific uplink transmission is configured for a RO associated with a selected SSB and the uplink transmission is deferred to a next RO associated the selected SSB based on the prioritization.

5. The processor of claim 2, wherein the HD-FDD collision handling technique further comprises prioritizing ROs over SSB reception.

6. The processor of claim 2, wherein the HD-FDD collision handling technique further comprises prioritizing physical random access channel (PRACH) transmission initiated by a physical downlink control channel (PDCCH) order of a contention-free random access procedure (CFRA) procedure over SSB reception and prioritizing SSB reception over PRACH transmission of a contention based random access procedure.

7. The processor of claim 1, the operations further comprising:

determining that a random access channel (RACH) occasion (RO) configured by a higher-layer parameter is invalid based on the RO overlapping a synchronization signal block (SSB), wherein a valid RO is used for a mapping between SSBs and ROs and an invalid RO is not used for the mapping.

8. The processor of claim 1, the operations further comprising:

determining that a random access channel (RACH) occasion (RO) configured by a higher-layer parameter is invalid based on the RO overlapping a predetermined number of symbols relative to a last symbol of a synchronization signal block (SSB), wherein a valid RO is used for a mapping between SSBs and ROs and an invalid RO is not used for the mapping.

9. The processor of claim 1, wherein the HD-FDD collision handling technique further comprises prioritizing a valid random access channel (RACH) occasion (RO) over cell specific downlink reception, wherein the valid RO is used for a mapping between SSBs and ROs and an invalid RO is not used for the mapping.

10. The processor of claim 9, wherein the downlink reception is configured by higher layer signaling includes at least one of type 0 common search space (CSS), type OA CSS, type 1 CSS, type 2 CSS, channel state information (CSI)-reference signal (RS), tracking reference signal (TRS) and positioning reference signal (PRS).

11. The processor of claim 1, wherein the HD-FDD collision handling technique further comprises prioritizing a type 1 physical downlink control channel (PDCCH) common search space (CSS) reception over a valid random access channel (RACH) occasion (RO) when the type 1 PDCCH CSS is located within a random access response (RAR) window and prioritizing the valid RO over the type 1 PDCCH CSS when the type 1 PDCCH CSS is not located within the RAR, wherein the valid RO is used for a mapping between SSBs and ROs and an invalid RO is not used for the mapping.

12. The processor of claim 1, wherein the HD-FDD collision handling technique further comprises implementing a priority between random access channel (RACH) occasions (ROs) and cell-specific downlink reception, wherein the priority is indicated via higher layer signaling.

13. The processor of claim 1, wherein the HD-FDD collision handling technique further comprises implementing a priority between random access channel (RACH) occasions (ROs) and cell-specific downlink reception, wherein the priority is indicated via downlink control information (DCI) format 2_0.

14. The processor of claim 1, wherein the HD-FDD collision handling technique further comprises prioritizing contention free random access (CFRA) transmission triggered by a downlink control information (DCI) when a first symbol of the CFRA occurs within a predetermined duration relative to a last symbols of a control resource set (CORESET) during which the UE received the DCI.

15. A user equipment (UE), comprising:

a transceiver configured to communicate with a base station; and a processor communicatively coupled to the transceiver and configured to perform operations comprising:

determining that half-duplex frequency division duplex (HD-FDD) is enabled by a network with which the UE is communicating;

identifying a collision between a cell-specific downlink reception and a cell-specific uplink transmission; and implementing a HD-FDD collision handling technique, wherein the HD-FDD collision handling technique comprises prioritizing a valid random access channel (RACH) occasion (RO) over a cell-specific downlink reception except for a downlink reception corresponding to type 0 common search space (CSS), type OA CSS, type 1 CSS or type 2 CSS which is prioritized over the valid RO, wherein the valid RO is used for a mapping between SSBs and ROs and an invalid RO is not used for the mapping.

16. The UE of claim 15, the operations further comprising:

determining that all random access channel (RACH) occasions (ROs) configured by a system information block 1 (SIB1) are valid, wherein a valid RO is used for a mapping between synchronization signal blocks (SSBs).

17. The UE of claim 16, wherein the HD-FDD collision handling technique further comprises prioritizing SSB reception over ROs.

18. The UE of claim 17, wherein the cell-specific uplink transmission is configured for a RO associated with a selected SSB and the uplink transmission is deferred to a next RO associated the selected SSB based on the prioritization.

19. The UE of claim 16, wherein the HD-FDD collision handling technique further comprises prioritizing ROs over SSB reception.

20. The UE of claim 16, wherein the HD-FDD collision handling technique further comprises prioritizing physical random access channel (PRACH) transmission initiated by a physical downlink control channel (PDCCH) order of a contention-free random access procedure (CFRA) procedure over SSB reception and prioritizing SSB reception over PRACH transmission of a contention based random access procedure.

\* \* \* \* \*